US010844271B2

(12) United States Patent
Alsaihati et al.

(10) Patent No.: US 10,844,271 B2
(45) Date of Patent: Nov. 24, 2020

(54) CEMENT SLURRIES, CURED CEMENT AND METHODS OF MAKING AND USE THEREOF

(71) Applicant: Saudi Arabian Oil Company, Dhahran (SA)

(72) Inventors: Zainab Alsaihati, Saihat (SA); Abdullah Al-Yami, Dhahran (SA); Vikrant Wagle, Abqaiq (SA); Abdullah Al-Awadh, Dammam (SA); Abdulaziz Alhelal, Alhsa Hofuf (SA); Nasser Alhareth, Ras Tanura (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/675,790

(22) Filed: Nov. 6, 2019

(65) Prior Publication Data

US 2020/0131426 A1 Apr. 30, 2020

Related U.S. Application Data

(62) Division of application No. 16/170,425, filed on Oct. 25, 2018.

(51) Int. Cl.
| | | |
|---|---|---|
| C09K 8/46 | (2006.01) | |
| C04B 28/04 | (2006.01) | |
| C04B 28/14 | (2006.01) | |
| E21B 33/14 | (2006.01) | |

(52) U.S. Cl.
CPC .......... *C09K 8/46* (2013.01); *C04B 28/04* (2013.01); *C04B 28/14* (2013.01); *E21B 33/14* (2013.01); *C04B 2201/20* (2013.01)

(58) Field of Classification Search
CPC ....... C09K 8/46; C04B 28/14; C04B 2201/20; E21B 33/14

See application file for complete search history.

(56) References Cited

U.S. PATENT DOCUMENTS

| | | | |
|---|---|---|---|
| 3,499,491 | A | 3/1970 | Wyant et al. |
| 5,352,288 | A | 10/1994 | Mallow |
| 5,693,137 | A | 12/1997 | Styron |
| 6,733,583 | B2 | 5/2004 | Frailey et al. |
| 7,141,112 | B2 | 11/2006 | Comrie |
| 7,631,692 | B2 | 12/2009 | Roddy et al. |
| 7,867,954 | B2 | 1/2011 | Warrender et al. |
| 8,323,399 | B2 | 12/2012 | Guynn et al. |
| 9,067,824 | B1 | 6/2015 | Hansen et al. |
| 2003/0205172 | A1 | 11/2003 | Gleeson et al. |
| 2003/0233962 | A1 | 12/2003 | Dongell |
| 2008/0028994 | A1 | 2/2008 | Barlet-Gouedard et al. |
| 2011/0259246 | A1 | 10/2011 | Guynn et al. |
| 2012/0108471 | A1* | 5/2012 | Amanullah ............ C09K 8/145 507/104 |
| 2013/0316936 | A1 | 11/2013 | Amanullah et al. |
| 2014/0090843 | A1 | 4/2014 | Boul et al. |
| 2014/0326455 | A1* | 11/2014 | Ravi ........................ C04B 7/02 166/293 |
| 2014/0332216 | A1* | 11/2014 | Ravi ....................... C04B 28/04 166/293 |
| 2014/0353043 | A1* | 12/2014 | Amanullah ........... E21B 21/003 175/72 |

FOREIGN PATENT DOCUMENTS

| | | |
|---|---|---|
| WO | 9321122 A1 | 10/1993 |
| WO | 2008012438 A2 | 1/2008 |
| WO | 2014197417 A1 | 12/2014 |

OTHER PUBLICATIONS

Kupwade-Patil, K., Chin, S., Ilavsky, J. et al. "Hydration kinetics and morphology of cement pastes with pozzolanic volcanic ash studied via synchrotron-based techniques". Journal of Material Science, Kluwer Academic Publishers, Dordrecht, vol. 53, No. 3, 1743-1757 (2018). (Year: 2018).*
Notice of Allowance dated May 28, 2020 pertaining to U.S. Appl. No. 16/170,425, filed Oct. 25, 2018, 6 pgs.
Kupwade-Patil, K. et al. "Hydration kinetics and morphology of cement pastes with pozzolanic volcanic ash studied via synchrotron-based techniques" Journal of Material Science, Oct. 13, 2017, pp. 1743-1757, vol. 53, No. 3, Kluwer Academic Publishers, Dordrecht.
International Search Report and Written Opinion dated Dec. 3, 2019 pertaining to International application No. PCT/US2019/055892 filed Oct. 11, 2019.
Office Action dated Mar. 17, 2020 pertaining to U.S. Appl. No. 16/170,425, filed Oct. 25, 2018, 19 pgs.
Office Action dated Jan. 9, 2020 pertaining to U.S. Appl. No. 16/675,820, filed Nov. 6, 2019, 15 pgs.

* cited by examiner

*Primary Examiner* — Crystal J Miller
(74) *Attorney, Agent, or Firm* — Dinsmore & Shohl

(57) ABSTRACT

Cement slurries, cured cements, and methods of making cured cement and methods of using cement slurries are provided. The cement slurries have, among other attributes, increased yield point, reduced density, improved mechanical properties, increased resistance to $H_2S$, and may be used, for instance, in the oil and gas drilling industry. The cement slurry comprises cement precursor material, Saudi Arabian volcanic ash, and an aqueous solution. The Saudi Arabian volcanic ash comprises $SO_3$, $CaO$, $SiO_2$, $Al_2O_3$, $Fe_2O_3$, $MgO$, and $K_2O$ and the cement slurry is free of any other $SiO_2$ additive.

9 Claims, No Drawings

CEMENT SLURRIES, CURED CEMENT AND METHODS OF MAKING AND USE THEREOF

CROSS-REFERENCE TO RELATED APPLICATION

This application is a divisional application of U.S. patent application Ser. No. 16/170,425 filed Oct. 25, 2018, the entire disclosure of which is hereby incorporated herein by reference.

TECHNICAL FIELD

Embodiments of the present disclosure generally relate to cement slurries and methods of making and using cement slurries and to cure cements and methods of making cured cement. Specifically, embodiments of the present disclosure relate to cement slurries and cured cements that include Saudi Arabian volcanic ash and methods of making and using cement slurries and cured cements that include Saudi Arabian volcanic ash.

BACKGROUND

Cement slurries are used in the oil and gas industries, such as for cementing in oil and gas wells. Primary, remedial, squeeze, and plug cementing techniques can be used, for instance, to place cement sheaths in an annulus between casing and well formations, for well repairs, well stability, and for well abandonment (sealing an old well to eliminate safety hazards). These cement slurries must be able to consistently perform over a wide range of temperatures and pressures, in the presence of certain corrosive chemical species, and under challenging mechanical conditions, as oil and gas wells can be located in a multitude of diverse locations. For example, a cement slurry may be used in conditions of less than 0° C. in freezing permafrost zones, and in temperatures exceeding 400° C. in geothermal wells and, as such, must be able to properly set under an assortment of conditions.

Proper placement of a cement slurry can be vital to wellbore isolation. However, conventional cement solutions may have a density greater than 300 pounds per cubic feet (lb/ft$^3$), and a yield point of less than 20 pounds force per 100 square feet (lb/100 ft$^2$), leading to inconsistent flowability and creating concerns when handling or pumping the cement, as uniform placement of the slurry can be quite difficult. Moreover, cement slurries with a greater density increase the hydrostatic pressure that the cement column exerts on the wellbore, leading to poor isolation in weak zones that may break or crack under pressure. Cement slurries with a reduced density and increased yield point allow for more uniform flowability and more accurate and precise placement of the cement. Furthermore, cement slurries with a reduced density may be placed in a single stage, eliminating the need for multistage cementing tools.

SUMMARY

Accordingly, there is an ongoing need for cement slurries having a reduced density and an increased yield point. The present embodiments address these needs by providing cement slurries and methods of making and using cement slurries that include Saudi Arabian volcanic ash to serve as an extender to decrease the density and increase the yield point of the cement.

In one embodiment, a method of making a cement slurry is provided, comprising mixing cement precursor material, Saudi Arabian volcanic ash, and an aqueous solution to form the cement slurry. The Saudi Arabian volcanic ash comprises $SO_3$, $CaO$, $SiO_2$, $Al_2O_3$, $Fe_2O_3$, $MgO$, and $K_2O$ and the cement slurry is free of any other $SiO_2$ additive.

In another embodiment, a method of cementing a casing in a wellbore is provided, comprising mixing cement precursor material, Saudi Arabian volcanic ash, and an aqueous solution to form a cement slurry, introducing the cement slurry into an annulus between the casing and the wellbore, and curing the cement slurry to cement the casing in the wellbore. The Saudi Arabian volcanic ash comprises $SO_3$, $CaO$, $SiO_2$, $Al_2O_3$, $Fe_2O_3$, $MgO$, and $K_2O$ and the cement slurry is free of any other $SiO_2$ additive.

In yet another embodiment, a method of making a cement slurry is provided comprising mixing cement precursor material, from 8 to 60 weight percent (wt. %) by weight of cement precursor (BWOC) Saudi Arabian volcanic ash, and an aqueous solution to form the cement slurry. The Saudi Arabian volcanic ash comprises from 0.05 to 0.2 wt. % $SO_3$, from 5 to 10 wt. % $CaO$, from 40 to 50 wt. % $SiO_2$, from 10 to 20 wt. % $Al_2O_3$, from 10 to 15 wt. % $Fe_2O_3$, from 5 to 10 wt. % $MgO$, and from 0.5 to 5 wt. % $K_2O$. The cement slurry is free of any other $SiO_2$ additive, has a density of from 110 to 160 lb/ft$^3$, and has a plastic viscosity of from 30 to 70 centiPoise (cP).

Additional features and advantages of the described embodiments will be set forth in the detailed description which follows, and in part will be readily apparent to those skilled in the art from that description or recognized by practicing the described embodiments, including the detailed description which follows as well as the claims.

DETAILED DESCRIPTION

As used throughout this disclosure, the term "cement slurry" refers to a composition comprising a cement precursor that is mixed with at least water to form cement. The cement slurry may contain calcined alumina ($Al_2O_3$), silica ($SiO_2$), calcium oxide (CaO, also known as lime), iron oxide ($Fe_2O_3$), magnesium oxide (MgO), clay, sand, gravel, and mixtures thereof.

As used throughout this disclosure, the term "consistency" refers to a rheological property of matter related to the cohesion of the individual particles of a given material, its ability to deform and its resistance to flow. The consistency of cement slurries is determined by thickening time tests in accordance with API Recommended Practice 10B and is expressed in Bearden units of consistency (Bc), a dimensionless quantity with no direction conversion factor to more common units of viscosity. The Bearden units of consistency is measured on a scale from 1 to 100 where, conventionally, difficult pumping is thought to begin at 50 Bc, and cement is completely set at 100 Bc.

As used throughout this disclosure, the term "curing" refers to providing adequate moisture, temperature and time to allow the concrete to achieve the desired properties (such as hardness) for its intended use through one or more reactions between the water and the cement precursor material.

As used throughout this disclosure, the term "drying" refers to merely allowing the cement to achieve a moisture condition appropriate for its intended use, which may only involve physical state changes, as opposed to chemical reactions.

As used throughout this disclosure, the term "extender" refers to a cement extender, that is, a chemical additive or inert material used to decrease the density of a cement slurry and increase the yield point. Reducing the slurry density reduces the hydrostatic pressure of the cement column in the wellbore, leading to successful wellbore isolation.

As used throughout this disclosure, the term "free of" as used to describe any chemical or component refers to not including more than trace amounts of the chemical or component, where trace amounts refers to having less than 0.1% of the chemical or component.

As used throughout this disclosure, the term "plastic viscosity" refers to the slope of the shear stress/shear rate line greater than the yield point. Plastic viscosity represents the viscosity of a fluid when extrapolated to infinite shear rate. Plastic viscosity is increased by a viscous base fluid and by excess colloidal solids.

As used throughout this disclosure, the term "point of departure" refers to the beginning of thickening of a cement slurry during the thickening-time test, and is often abbreviated as POD. For some cement slurries, the POD is used as the thickening time.

As used throughout this disclosure, the term "retarder" refers to a chemical agent used to increase the thickening time of cement slurries to enable proper placement. The need for cement retardation increases with depth due to the greater time required to complete the cementing operation and the effect of increased temperature on the cement-setting process.

As used throughout this disclosure, the term "shear stress" refers to the force per unit area required to sustain a constant rate of fluid movement.

As used throughout this disclosure, the term "shear rate" refers to the rate of change of velocity at which one layer of fluid passes over an adjacent layer.

As used throughout this disclosure, the term "subsurface formation" refers to a body of rock that is sufficiently distinctive and continuous from the surrounding rock bodies that the body of rock can be mapped as a distinct entity. A subsurface formation is, therefore, sufficiently homogenous to form a single identifiable unit containing similar rheological properties throughout the subsurface formation, including, but not limited to, porosity and permeability. A subsurface formation is the fundamental unit of lithostratigraphy.

As used throughout this disclosure, the term "thickening time" refers to a measurement of the time during which a cement slurry remains in a fluid state and is capable of being pumped. Thickening time is assessed under downhole conditions using a pressurized consistometer that plots the viscosity of a slurry over time under the anticipated temperature and pressure conditions. The end of the thickening time is conventionally about 50 or 70 Bc.

As used throughout this disclosure, the term "wellbore" refers to the drilled hole or borehole, including the openhole or uncased portion of the well. Borehole may refer to the inside diameter of the wellbore wall, the rock face that bounds the drilled hole.

As used throughout this disclosure, the term "yield point" refers to the point in the stress-strain curve at which the curve levels off and plastic deformation begins to occur. Yield point is used to evaluate the void filling properties of cements and the ability of a cement to flow through the annulus. A greater yield point implies a non-Newtonian fluid, one that flows more uniformly than a fluid of similar density but lesser yield point. Yield point is increased by adding freshly dispersed clay or a flocculant, such as lime.

Embodiments of the present disclosure relate to cement slurries with improved retardation and without gelation issues. Embodiments of the present disclosure also relate to methods of producing and using cement slurries, in some particular embodiments, for use in the oil and gas industries.

Embodiments of the present disclosure relate to cement slurries with decreased density. As a non-limiting example, the cement slurries of the present disclosure may be used in the oil and gas drilling industries, such as for cementing in oil and gas wells. Oil and gas wells may be formed in subsurface formations. The wellbore may serve to connect natural resources, such as petrochemical products, to a ground level surface. In some embodiments, a wellbore may be formed in the subsurface formation, which may be formed by a drilling procedure. To drill a subterranean well or wellbore, a drill string including a drill bit and drill collars to weight the drill bit is inserted into a predrilled hole and rotated to cut into the rock at the bottom of the hole, producing rock cuttings. Commonly, drilling fluid may be utilized during the drilling process. To remove the rock cuttings from the bottom of the wellbore, drilling fluid is pumped down through the drill string to the drill bit. The drilling fluid cools the drill bit and lifts the rock cuttings away from the drill bit and carries the rock cuttings upwards as the drilling fluid is recirculated back to the surface.

In some instances, a casing may be inserted into the wellbore. The casing may be a pipe or other tubular structure which has a diameter less than that of the wellbore. Generally, the casing may be lowered into the wellbore such that the bottom of the casing reaches to a region near the bottom of the wellbore. In some embodiments, the casing may be cemented by inserting a cement slurry into the annulus region between the outer edge of the casing and the edge of the wellbore (the surface of the subsurface formation). The cement slurry may be inserted into the annular region by pumping the cement slurry into the interior portion of the casing, to the bottom of the casing, around the bottom of the casing, into the annular region, or a combination of some or all of these. The cement slurry may displace the drilling fluid, pushing it to the top of the well. In some embodiments, a spacer fluid may be used as a buffer between the cement slurry and the drilling fluid by displacing and removing the drilling fluid before the cement slurry is pumped into the well to prevent contact between the drilling fluid and the cement slurry. Following the insertion of an appropriate amount of cement slurry into the interior region of the casing, in some embodiments, a displacement fluid may be utilized to push the cement slurry out of the interior region of the casing and into the annular region. This displacement may cause the entirety of the spacer fluid and drilling fluid to be removed from the annular region, out the top of the wellbore. The cement slurry may then be cured or otherwise allowed to harden.

To ensure the stability and safety of a well, it is important that the cement slurry properly harden into cured cement. If the cement slurry is not evenly placed or fluid is lost from the cement slurry before curing, the cement slurry may not evenly harden into a cured cement. Therefore, the density, viscosity, flowability, and thickening time of a cement slurry are important properties to ensure proper placement. Specifically, thickening time may be retarded by the use of retarder additives, creating more time for optimal placement of the cement before setting. Similarly, reducing fluid loss from the cement slurry ensures uniform hardening, as curing often involves water-based reactions with the cement slurry. Too much or too little water affects the hardness and, thus, the quality of the cured cement produced.

A number of conditions may impact the fluid loss of a cement slurry. For instance, water may be drawn from the slurry into the permeable subsurface formation, particularly if pumping ceases and the slurry becomes static without hardening. Water may also be lost due to displacement as the cement slurry is passed through constrictions, such as the tight clearance between a casing and an annulus, which may "squeeze" water from the slurry. Adverse weather and soil conditions may additionally impact the amount of water present in the cement slurry. As such, control of fluid loss of the cement slurry may allow for a more uniform and stronger cured cement.

To ensure the stability and safety of a well, it is important that the cured cement maintains integrity and isolates the wellbore from the surrounding subsurface formations. If the cement cracks or degrades under cyclic stresses, wellbore integrity and isolation may be lost, resulting in undesirable fluid communication between the wellbore and surrounding subsurface formations. Not intending to be limited by theory, this fluid communication may result in drilling fluid loss from the wellbore into the surrounding subsurface formation, or in decreased wellbore pressure, possibly leading to a well control event. Therefore, wellbore integrity and isolation are critical to efficient production and use of a wellbore.

The present disclosure provides methods of making cement slurries which may have, among other attributes, reduced density, increased yield point, improved mechanical properties, and increased resistance to $H_2S$ to address these concerns. The method of making the cement slurry of the present disclosure includes mixing cement precursor material, Saudi Arabian volcanic ash, and an aqueous solution to form the cement slurry, in which the Saudi Arabian volcanic ash comprises $SO_3$, $CaO$, $SiO_2$, $Al_2O_3$, $Fe_2O_3$, $MgO$, and $K_2O$ and the cement slurry is free of any other $SiO_2$ additive. Without being bound by any particular theory, use of Saudi Arabian volcanic ash may provide the cured cement with increased yield point, reduced density, improved mechanical properties, and increased resistance to $H_2S$ of the cement slurry.

The mixing step, in some embodiments, may involve shearing the aqueous solution, cement precursor material, Saudi Arabian volcanic ash, and, optionally, other additives at a suitable speed for a suitable period of time to form the cement slurry. In one embodiment, the mixing may be done in the lab using a standard API blender for 15 seconds at 4,000 revolutions per minute (rpm) and 35 seconds at 12,000 rpm. The equation of mixing energy is:

$$\frac{E}{M} = \frac{k\omega^2 t}{V} \quad \text{(Equation 1)}$$

Where
E=Mixing energy (kiloJoules (kJ))
M=Mass of slurry (kilograms (kg))
k=6.1×10$^{-8}$ m$^5$/s (constant found experimentally)
ω=Rotational speed (radians/second (s$^{-1}$))
t=Mixing time (s)
V=Slurry volume (m$^3$)

The cement precursor material may be any suitable material which, when mixed with water, can be cured into a cement. The cement precursor material may be hydraulic or non-hydraulic. A hydraulic cement precursor material refers to a mixture of limestone, clay and gypsum burned together under temperatures greater than 1000° C. that may begin to harden instantly or within a few minutes while in contact with water. A non-hydraulic cement precursor material refers to a mixture of lime, gypsum, plasters and oxychloride. A non-hydraulic cement precursor may take longer to harden or may require drying conditions for proper strengthening, but often is more economically feasible. A hydraulic or non-hydraulic cement precursor material may be chosen based on the desired application of the cement slurry of the present disclosure. In some embodiments, the cement precursor material may be Portland cement precursor, for example, Class G Portland Cement. Portland cement precursor is a hydraulic cement precursor (cement precursor material that not only hardens by reacting with water but also forms a water-resistant product) produced by pulverizing clinkers, which contain hydraulic calcium silicates and one or more of the forms of calcium sulfate as an interground addition. In other embodiments, the cement precursor material may be Saudi cement precursor, a combination of Portland cement precursor and crystalline silica, also known as quartz.

The cement precursor material may include one or more of calcium hydroxide, silicates, oxides, belite ($Ca_2SiO_5$), alite ($Ca_3SiO_4$), tricalcium aluminate ($Ca_3Al_2O_6$), tetracalcium aluminoferrite ($Ca_4Al_2Fe_2O_{10}$), brownmilleriate ($4CaO.Al_2O_3.Fe_2O_3$), gypsum ($CaSO_4.2H_2O$) sodium oxide, potassium oxide, limestone, lime (calcium oxide), hexavalent chromium, trivalent chromium, calcium aluminate, silica sand, silica flour, hematite, manganese tetroxide, other similar compounds, and combinations of these. The cement precursor material may include Portland cement, siliceous fly ash, calcareous fly ash, slag cement, silica fume, quartz, any known cement precursor material or combinations of any of these. Silica flour is a finely ground crystalline silica with a molecular formula of $SiO_2$ and with a grain size ranging from 1 to 500 microns, from 10 to 500 microns, from 10 to 100 microns, from 10 to 80 microns, from 10 to 50 microns, from 10 to 20 microns, from 20 to 100 microns, from 20 to 80 microns, from 20 to 50 microns, from 50 to 100 microns, from 50 to 80 microns, or from 80 to 100 microns.

The cement slurry may include Saudi Class G cement. Saudi Class G cement may include from 60 to 100 wt. %, from 60 to 99 wt. %, from 60 to 98 wt. %, from 60 to 97 wt. %, from 60 to 96 wt. %, from 60 to 95 wt. %, from 60 to 90 wt. %, from 60 to 80 wt. %, from 60 to 70 wt. %, from 70 to 100 wt. %, from 70 to 99 wt. %, from 70 to 98 wt. %, from 70 to 97 wt. %, from 70 to 96 wt. %, from 70 to 95 wt. %, from 70 to 90 wt. %, from 70 to 80 wt. %, from 80 to 100 wt. %, from 80 to 99 wt. %, from 80 to 98 wt. %, from 80 to 97 wt. %, from 80 to 96 wt. %, from 80 to 95 wt. %, from 80 to 90 wt. %, from 90 to 100 wt. %, from 90 to 99 wt. %, from 90 to 98 wt. %, from 90 to 97 wt. %, from 90 to 96 wt. %, from 90 to 95 wt. %, from 95 to 100 wt. %, from 95 to 99 wt. %, from 95 to 98 wt. %, from 95 to 97 wt. %, from 95 to 96 wt. %, from 96 to 100 wt. %, from 96 to 99 wt. %, from 96 to 98 wt. %, from 96 to 97 wt. %, from 97 to 100 wt. %, from 97 to 99 wt. %, from 97 to 98 wt. %, from 98 to 100 wt. %, from 98 to 99 wt. %, or from 99 to 100 Portland cement. Saudi Class G cement may include less than 40 wt. %, less than 30 wt. %, less than 20 wt. %, less than 10 wt. %, less than 5 wt. %, less than 4 wt. %, less than 3 wt. %, less than 2 wt. %, or less than 1 wt. % crystalline silica, or quartz. Saudi Class G cement may have a pH of greater than 7, of from 8 to 14, of from 10 to 13, of from 11 to 13, of from 12 to 13, or of 12.4. Saudi Class G cement may have a bulk density at 20° C. of from 70 to 120 lb/ft$^3$, of from 80 to 110 lb/ft$^3$, of from 90 to 100 lb/ft$^3$, or of 94 lb/ft³. Saudi Class G cement may have a solubility in water of from 0.1 to 2 grams per 100 milliliters (g/100 ml), of from 0.1 to 1 g/100 ml, of from 0.1 to 0.8 g/100 ml, of from 0.1 to 0.5 g/100 ml, of from 0.2 to 2 g/100 ml, of from 0.2 to 1 g/100 ml, of from 0.2 to 0.8 g/100 ml, of from 0.2 to 0.5 g/100 ml, of from 0.4 to 2 g/100 ml, of from 0.4 to 1 g/100 ml, of from 0.4 to 0.8 g/100 ml, of from 0.4 to 0.5 g/100 ml, of from 0.5 to 2 g/100 ml, of from 0.5 to 1 g/100 ml, of from 0.5 to 0.8 g/100 ml, or of 0.5 g/100 ml.

An aqueous solution may be added to the cement precursor material to produce the slurry. The aqueous solution may include one or more than one of deionized water, tap water, fresh water, salt water, natural or synthetic brine, municipal water, formation water, produced water, well water, filtered water, distilled water, sea water, other type of water, or combinations of waters. In some embodiments, the aqueous solution may include water or a solution containing water and one or more inorganic compounds dissolved in the water or otherwise completely miscible with the water. In some embodiments, the aqueous solution may contain brine, including natural and synthetic brine. In some embodiments, salt or other organic compounds may be incorporated into the aqueous solution to control certain properties of the water, and thus the cement slurry, such as density. Without being bound by any particular theory, increasing the saturation of the aqueous solution by increasing the salt concentration or the level of other organic compounds in the water may increase the density of the water, and thus, the cement slurry. Suitable salts may include, but are not limited to, alkali metal chlorides, hydroxides, or carboxylates. In some embodiments, suitable salts may include sodium, calcium, cesium, zinc, aluminum, magnesium, potassium, strontium, silicon, lithium, chlorides, bromides, carbonates, iodides, chlorates, bromates, formates, nitrates, sulfates, phosphates, oxides, fluorides, and combinations of these.

In some embodiments, the cement slurry may contain from 10 to 70 wt. % BWOC aqueous solution. In some embodiments, the cement slurry may contain from 10 to 40 wt. %, from 10 to 30 wt. %, from 10 to 20 wt. %, from 20 to 40 wt. %, from 25 to 35 wt. %, or from 20 to 30 wt. % BWOC water. The cement slurry may contain 30 wt. % BWOC aqueous solution.

Along with the cement precursor material and aqueous solution, the cement slurry includes Saudi Arabian volcanic ash. The Saudi Arabian volcanic ash functions as an extender, reducing the density of the cement slurry and increasing the yield point of the cement slurry. The Saudi Arabian volcanic ash may have a particle size of from 20 to 30 microns. The Saudi Arabian volcanic ash is free of $TiO_2$. The Saudi Arabian volcanic ash may comprise from 0.05 to 2 wt. %, from 0.05 to 1 wt. %, from 0.05 to 0.8 wt. %, from 0.05 to 0.5 wt. %, from 0.05 to 0.2 wt. %, from 0.05 to 0.15 wt. %, from 0.05 to 0.1 wt. %, from 0.1 to 2 wt. %, from 0.1 to 1 wt. %, from 0.1 to 0.8 wt. %, from 0.1 to 0.5 wt. %, from 0.1 to 0.2 wt. %, from 0.1 to 0.15 wt. %, from 0.15 to 2 wt. %, from 0.15 to 1 wt. %, from 0.15 to 0.8 wt. %, from 0.15 to 0.5 wt. %, from 0.15 to 0.2 wt. %, from 0.2 to 2 wt. %, from 0.2 to 1 wt. %, from 0.2 to 0.8 wt. %, or from 0.2 to 0.5 wt. % $SO_3$. More specifically, the Saudi Arabian volcanic ash may comprise from 0.05 to 0.2 wt. % $SO_3$, from 5 to 10 wt. % CaO, from 40 to 50 wt. % $SiO_2$, from 10 to 20 wt. % $Al_2O_3$, from 10 to 15 wt. % $Fe_2O_3$, from 5 to 10 wt. % MgO, and from 0.5 to 5 wt. % $K_2O$. The cement slurry may include from 2 to 80 wt. % BWOC, from 5 to 80 wt. % BWOC, from 8 to 80 wt. % BWOC, from 15 to 80 wt. % BWOC, from 25 to 80 wt. % BWOC, from 40 to 80 wt. % BWOC, from 50 to 80 wt. % BWOC, from 60 to 80 wt. % BWOC, from 2 to 60 wt. % BWOC, from 5 to 60 wt. % BWOC, from 8 to 60 wt. % BWOC, from 15 to 60 wt. % BWOC, from 25 to 60 wt. % BWOC, from 40 to 60 wt. % BWOC, from 50 to 60 wt. % BWOC, from 2 to 50 wt. % BWOC, from 5 to 50 wt. % BWOC, from 8 to 50 wt. % BWOC, from 15 to 50 wt. % BWOC, from 25 to 50 wt. % BWOC, from 40 to 50 wt. % BWOC, from 2 to 40 wt. % BWOC, from 5 to 40 wt. % BWOC, from 8 to 40 wt. % BWOC, from 15 to 40 wt. % BWOC, from 25 to 40 wt. % BWOC, from 2 to 25 wt. % BWOC, from 5 to 25 wt. % BWOC, from 8 to 25 wt. % BWOC, from 15 to 25 wt. % BWOC, from 2 to 15 wt. % BWOC, from 5 to 15 wt. % BWOC, from 8 to 15 wt. % BWOC, from 2 to 8 wt. % BWOC, or from 5 to 8 wt. % BWOC Saudi Arabian volcanic ash.

The Saudi Arabian volcanic ash may comprise from 2 to 25 wt. %, from 2 to 20 wt. %, from 2 to 15 wt. %, from 2 to 10 wt. %, from 2 to 8 wt. %, from 2 to 5 wt. %, from 5 to 25 wt. %, from 5 to 20 wt. %, from 5 to 15 wt. %, from 5 to 10 wt. %, from 5 to 8 wt. %, from 8 to 25 wt. %, from 8 to 20 wt. %, from 8 to 15 wt. %, from 8 to 10 wt. %, from 10 to 25 wt. %, from 10 to 20 wt. %, or from 10 to 15 wt. % CaO. The Saudi Arabian volcanic ash may comprise from 30 to 70 wt. %, from 30 to 60 wt. %, from 30 to 55 wt. %, from 30 to 50 wt. %, from 30 to 45 wt. %, from 30 to 40 wt. %, from 35 to 70 wt. %, from 35 to 60 wt. %, from 35 to 55 wt. %, from 35 to 50 wt. %, from 35 to 45 wt. %, from 35 to 40 wt. %, from 40 to 70 wt. %, from 40 to 60 wt. %, from 40 to 55 wt. %, from 40 to 50 wt. %, from 40 to 45 wt. %, from 45 to 70 wt. %, from 45 to 60 wt. %, from 45 to 55 wt. %, from 45 to 50 wt. %, from 50 to 70 wt. %, from 50 to 60 wt. %, or from 50 to 55 wt. % $SiO_2$. The Saudi Arabian volcanic ash may comprise from 2 to 40 wt. %, from 2 to 35 wt. %, from 2 to 30 wt. %, from 2 to 25 wt. %, from 2 to 20 wt. %, from 2 to 15 wt. %, from 2 to 10 wt. %, from 2 to 5 wt. %, from 5 to 40 wt. %, from 5 to 35 wt. %, from 5 to 30 wt. %, from 5 to 25 wt. %, from 5 to 20 wt. %, from 5 to 15 wt. %, from 5 to 10 wt. %, from 10 to 40 wt. %, from 10 to 35 wt. %, from 10 to 30 wt. %, from 10 to 25 wt. %, from 10 to 20 wt. %, from 10 to 15 wt. %, from 15 to 40 wt. %, from 15 to 35 wt. %, from 15 to 30 wt. %, from 15 to 25 wt. %, from 15 to 20 wt. %, from 20 to 40 wt. %, from 20 to 35 wt. %, from 20 to 30 wt. %, from 20 to 25 wt. % $Al_2O_3$. The Saudi Arabian volcanic ash may comprise from 2 to 30 wt. %, from 2 to 25 wt. %, from 2 to 20 wt. %, from 2 to 15 wt. %, from 2 to 13 wt. %, from 2 to 10 wt. %, from 2 to 8 wt. %, from 2 to 5 wt. %, from 5 to 30 wt. %, from 5 to 25 wt. %, from 5 to 20 wt. %, from 5 to 15 wt. %, from 5 to 13 wt. %, from 5 to 10 wt. %, from 5 to 8 wt. %, from 8 to 30 wt. %, from 8 to 25 wt. %, from 8 to 20 wt. %, from 8 to 15 wt. %, from 8 to 13 wt. %, from 8 to 10 wt. %, from 10 to 30 wt. %, from 10 to 25 wt. %, from 10 to 20 wt. %, from 10 to 15 wt. %, from 10 to 13 wt. %, from 13 to 30 wt. %, from 13 to 25 wt. %, from 13 to 20 wt. %, from 13 to 15 wt. %, from 15 to 30 wt. %, from 15 to 25 wt. %, or from 15 to 20 wt. % $Fe_2O_3$. The Saudi Arabian volcanic ash may comprise from 2 to 25 wt. %, from 2 to 20 wt. %, from 2 to 15 wt. %, from 2 to 10 wt. %, from 2 to 8 wt. %, from 2 to 5 wt. %, from 5 to 25 wt. %, from 5 to 20 wt. %, from 5 to 15 wt. %, from 5 to 10 wt. %, from 5 to 8 wt. %, from 8 to 25 wt. %, from 8 to 20 wt. %, from 8 to 15 wt. %, from 8 to 10 wt. %, from 10 to 25 wt. %, from 10 to 20 wt. %, or from 10 to 15 wt. % MgO. The Saudi Arabian volcanic ash may comprise from 0.2 to 10 wt. %, from 0.2 to 7 wt. %, from 0.2 to 5 wt. %, from 0.2 to 3 wt. %, from 0.2 to 2 wt. %, from 0.2 to 1 wt. %, from 0.2 to 0.5 wt. %, from 0.5 to 10 wt. %, from 0.5 to 7 wt. %, from 0.5 to 5 wt. %, from 0.5 to 3 wt. %, from 0.5 to 2 wt. %, from 0.5 to 1 wt. %, from 1 to 10 wt. %, from 1 to 7 wt. %, from 1 to 5 wt. %, from 1 to 3 wt. %, from 1 to 2 wt. %, from 2 to 10 wt. %, from 2 to 7 wt. %, from 2 to 5 wt. %, from 1 to 3 wt. %, from 3 to 10 wt. %, from 3 to 7 wt. %, from 3 to 5 wt. %, from 5 to 10 wt. %, or from 5 to 7 wt. % $K_2O$.

In some embodiments, the cement slurry may contain at least one additive other than Saudi Arabian volcanic ash. The one or more additives may be any additives known to be suitable for cement slurries. As non-limiting examples, suitable additives may include accelerators, retarders, extenders, weighting agents, fluid loss control agents, lost circulation control agents, surfactants, antifoaming agents, specialty additives such as elastomers or fibers, and combinations of these.

In some embodiments, the cement slurry may contain from 0.1 to 10 wt. % BWOC of the one or more additives based on the total weight of the cement slurry. For instance, the cement slurry may contain from 0.1 to 8 wt. % BWOC of the one or more additives, from 0.1 to 5 wt. % BWOC of the one or more additives, or from 0.1 to 3 wt. % BWOC of the one or more additives. The cement slurry may contain from 1 to 10 wt. % BWOC of the one or more additives, from 1 to 8 wt. % BWOC, from 1 to 5 wt. % BWOC, or from 1 to 3 wt. % BWOC of the one or more additives. In some embodiments, the cement slurry may contain from 3 to 5 wt. % BWOC, from 3 to 8 wt. % BWOC, from 3 to 10 wt. % BWOC, or from 5 to 10 wt. % BWOC of the one or more additives.

In some embodiments, the one or more additives may include a dispersant containing one or more anionic groups. For instance, the dispersant may include synthetic sulfonated polymers, lignosulfonates with carboxylate groups, organic acids, hydroxylated sugars, other anionic groups, or combinations of any of these. Without being bound by any particular theory, in some embodiments, the anionic groups on the dispersant may be adsorbed on the surface of the cement particles to impart a negative charge to the cement slurry. The electrostatic repulsion of the negatively charged cement particles may allow the cement slurry to be dispersed and more fluid-like, improving flowability. This may allow for one or more of turbulence at lesser pump rates, reduction of friction pressure when pumping, reduction of water content, and improvement of the performance of fluid loss additives.

In some embodiments, the one or more additives may alternatively or additionally include a fluid loss additive. In some embodiments, the cement fluid loss additive may include non-ionic cellulose derivatives. In some embodiments, the cement fluid loss additive may be hydroxyethylcellulose (HEC). In other embodiments, the fluid loss additive may be a non-ionic synthetic polymer (for example, polyvinyl alcohol or polyethyleneimine). In some embodiments, the fluid loss additive may include bentonite, which may additionally viscosify the cement slurry and may, in some embodiments, cause additional retardation effects.

In some embodiments, the cement slurry may contain from 0.1 to 10 wt. % BWOC of one or more fluid loss additives, the one or more dispersants, or both. The cement slurry may contain from 0.02 to 90 pound per barrel (lb/bbl) of the fluid loss additives, the one or more dispersants, or both based on the total weight of the cement slurry. For instance, the cement slurry may contain from 0.1 to 90 lb/bbl, from 0.1 to 75 lb/bbl, from 0.1 to 50 lb/bbl, from 1 to 90 lb/bbl, from 1 to 50 lb/bbl, from 5 to 90 lb/bbl, or from 5 to 50 lb/bbl of the fluid loss additives, the one or more dispersants, or both.

The cement slurry may have a thickening time at 100° F. of greater than 1, 1.5, 1.75, 2, or 5 hours. A thickening time test is used to simulate pumping conditions in order to determine a length of time before the cement becomes difficult or impossible to pump. The most common method to determine thickening time is via a pressurized consistometer. This device allows pressure and temperature to be applied to a cement slurry while it is being stirred (typically at 150 rpm). A resistor arm on a potentiometer indicates resistance to the paddle turning as the cement sets. The apparatus is calibrated to a standard output in Bearden Consistency units. The device is fully automated and can simulate squeeze schedules and/or batch mixing, etc.

The cement slurry may have a density of from 110 to 170 $lb/ft^3$. In other embodiments, the cement slurry may have a density of from 110 to 160 $lb/ft^3$, from 110 to 150 $lb/ft^3$, from 110 to 140 $lb/ft^3$, from 110 to 130 $lb/ft^3$, from 110 to 120 $lb/ft^3$, from 120 to 170 $lb/ft^3$, from 120 to 160 $lb/ft^3$, from 120 to 150 $lb/ft^3$, from 120 to 140 $lb/ft^3$, from 120 to 130 $lb/ft^3$, from 130 to 170 $lb/ft^3$, from 130 to 160 $lb/ft^3$, from 130 to 150 $lb/ft^3$, from 130 to 140 $lb/ft^3$, from 140 to 170 $lb/ft^3$, from 140 to 160 $lb/ft^3$, from 140 to 150 $lb/ft^3$, from 150 to 170 $lb/ft^3$, from 150 to 160 $lb/ft^3$, or from 160 to 170 $lb/ft^3$.

The viscosity of the cement slurry compositions may be measured using a standard oilfield viscometer, such as a FANN® Model 35 viscometer manufactured by Fann Instrument Company for example, according to test methods provided in the API Recommended Practice For Field Testing Water-Based Cement slurries (RP 13B-1/ISO 10414-1: 2002). The viscometer reports shear stress readings at various shear rates. The shear stress readings are reported in units of pounds of force per 100 square feet ($lbf/100\ ft^2$). The shear rate is measured in rpm. The viscometer may report shear stress readings at shear rates of at least one of 600 rpm, 300 rpm, 200 rpm, 100 rpm, 6 rpm, or 3 rpm. These shear stress readings may be used to determine the viscosity of the cement slurry at any of the shear rates, using Equation 2, assuming a viscometer with an R1 rotor sleeve, B1 bob, and F1 torsion spring:

$$\mu = \frac{300}{N}\theta_N \qquad \text{Equation 2}$$

Where
$\mu$=viscosity, (cp)
N=viscometer speed, shear rate (rpm)
$\theta_N$=viscometer reading, shear stress ($lbf/100\ ft^2$)

The rheology of cement slurry compositions may be modeled based on Bingham plastic flow behavior. In particular, the cement slurry composition having Saudi Arabian volcanic ash behaves as a rigid body at lesser shear stress but flows as a viscous fluid at greater shear stress. The rheological behavior of the cement slurry composition may be determined by measuring the shear stress on the cement slurry composition at different shear rates, which may be accomplished by measuring the shear stress and/or shear rate on the cement slurry composition using a FANN® Model 35 viscometer operated at 3 rpm, 6 rpm, 100 rpm, 200 rpm, 300 rpm, or 600 rpm, for example. A Bingham plastic fluid may be modeled by Equation 3.

$$\tau = (PV\dot{\gamma} + 4.79YP) \qquad \text{Equation 3}$$

Where
τ=shear stress, (dynes per square centimeter (dyne/cm$^2$))
PV=plastic viscosity, (cP)
$\dot{\gamma}$=shear rate, (s$^{-1}$)
YP=yield point, (lbf/100 ft$^2$)

The rheology of the cement slurry composition may be evaluated from the plastic viscosity (PV) and the yield point (YP), which are parameters from the Bingham plastic rheology model. The PV is related to the resistance of the cement slurry composition to flow due to mechanical interaction between the solids of the cement slurry composition and represents the viscosity of the cement slurry composition extrapolated to infinite shear rate. In other words, the PV is the slope of the shear stress versus shear rate curve of the Bingham plastic model. The PV reflects the type and concentration of the solids in the cement slurry composition, and a lesser PV is preferred. The PV of the cement slurry composition may be estimated by measuring the shear stress of the cement slurry using a FANN® Model 35 viscometer at shear rates of 300 rpm and 600 rpm and subtracting the 300 rpm shear stress measurement from the 600 rpm shear stress measurement according to Equation 4.

$$PV = \theta_{600} - \theta_{300} \qquad \text{Equation 4}$$

Where
PV=plastic viscosity, (cP)
$\theta_{600}$=shear stress viscometer reading at 600 rpm, (lbf/100 ft$^2$)
$\theta_{300}$=shear stress viscometer reading at 300 rpm, (lbf/100 ft$^2$)

When the shear stress measurement at 600 rpm is not available, the plastic viscosity may be calculated by determining the difference between any two shear stress measurements, dividing the difference by the difference of the shear rates that the two shear stresses were measured at, and multiplying that factor by 300. This formula is provided in Equation 5.

$$PV = \frac{300}{N_2 - N_1}(\theta_{N_2} - \theta_{N_1}) \qquad \text{Equation 5}$$

Where
PV=plastic viscosity, (cP)
N=viscometer speed, shear rate (rpm)
$\theta_N$=shear stress viscometer reading at N rpm, (lbf/100 ft$^2$)

The YP represents the shear stress less than which the cement slurry composition behaves as a rigid body and greater than which the cement slurry composition flows as a viscous fluid. In other words, the YP represents the amount of stress required to move the cement slurry composition from a static condition. The yield point is the resistance of initial flow of a fluid, or the stress required in order to move the fluid. It can be simply stated that the yield point is the attractive force among colloidal particles in cement slurry. The YP of a cement slurry composition is correlated with the capacity of the cement slurry composition to carry rock cuttings through the annulus, which in simplified terms indicates the cement slurry composition's hole-cleaning ability. The determination of yield points in cement slurries is important in the overall description of slurry flow properties. Yield point affects both the start-up pressure after a temporary shut-down and the void filling properties of cements during cementing operations. YP of equal to or greater than 15 lbf/100 ft$^2$ is considered acceptable for drilling. The YP is determined by extrapolating the Bingham plastic rheology model to a shear rate of zero. In other words, the PV is the y-intercept of the shear stress v. shear rate curve of the Bingham plastic model. The YP of the cement slurry composition may be estimated from the PV from Equation 5 by subtracting the PV from Equation 5 from the shear stress of the cement slurry measured at 300 rpm according to Equation 6.

$$YP = \theta_{300} - PV \qquad \text{Equation 6}$$

The YP is expressed as a force per area, such as in field units of lbf/100 ft$^2$, for example. The YP may be converted to SI units of dyne/cm$^2$, as 1 lbf/100 ft$^2$=4.79 dyne/cm$^2$. The methods for measuring and determining PV and YP for the cement slurry compositions having Saudi Arabian volcanic ash are consistent with methods conventionally used for cement slurries in general.

The cement slurry may have a plastic viscosity of from 50 to 350 cP. In other embodiments, the cement slurry may have a plastic viscosity of from 50 to 350 cP, from 50 to 300 cP, from 50 to 200 cP, from 50 to 150 cP, from 50 to 125 cP, from 50 to 100 cP, from 50 to 80 cP, from 50 to 60 cP, from 60 to 350 cP, from 60 to 300 cP, from 60 to 200 cP, from 60 to 150 cP, from 60 to 125 cP, from 60 to 100 cP, from 60 to 80 cP, from 80 to 350 cP, from 80 to 300 cP, from 80 to 200 cP, from 80 to 150 cP, from 80 to 125 cP, from 80 to 100 cP, from 100 to 350 cP, from 100 to 300 cP, from 100 to 200 cP, from 100 to 150 cP, from 100 to 125 cP, from 100 to 100 cP, from 100 to 80 cP, from 125 to 350 cP, from 125 to 300 cP, from 125 to 200 cP, from 125 to 150 cP, from 150 to 350 cP, from 150 to 300 cP, from 150 to 200 cP, from 200 to 300 cP, from 200 to 350 cP, or from 300 to 350 cP.

The cement slurry of the present disclosure may have a yield point of from 5 to 70 lbf/100 ft$^2$, from 5 to 60 lbf/100 ft$^2$, from 5 to 55 lbf/100 ft$^2$, from 5 to 40 lbf/100 ft$^2$, from 5 to 30 lbf/100 ft$^2$, from 5 to 25 lbf/100 ft$^2$, from 5 to 20 lbf/100 ft$^2$, from 5 to 15 lbf/100 ft$^2$, from 5 to 10 lbf/100 ft$^2$, from 10 to 70 lbf/100 ft$^2$, from 10 to 60 lbf/100 ft$^2$, from 10 to 55 lbf/100 ft$^2$, from 10 to 40 lbf/100 ft$^2$, from 10 to 30 lbf/100 ft$^2$, from 10 to 25 lbf/100 ft$^2$, from 10 to 20 lbf/100 ft$^2$, from 10 to 15 lbf/100 ft$^2$, from 15 to 70 lbf/100 ft$^2$, from 15 to 60 lbf/100 ft$^2$, from 15 to 55 lbf/100 ft$^2$, from 15 to 40 lbf/100 ft$^2$, from 15 to 30 lbf/100 ft$^2$, from 15 to 25 lbf/100 ft$^2$, from 15 to 20 lbf/100 ft$^2$, from 20 to 70 lbf/100 ft$^2$, from 20 to 60 lbf/100 ft$^2$, from 20 to 55 lbf/100 ft$^2$, from 20 to 40 lbf/100 ft$^2$, from 20 to 30 lbf/100 ft$^2$, from 20 to 25 lbf/100 ft$^2$, from 25 to 70 lbf/100 ft$^2$, from 25 to 60 lbf/100 ft$^2$, from 25 to 55 lbf/100 ft$^2$, from 25 to 40 lbf/100 ft$^2$, from 25 to 30 lbf/100 ft$^2$, from 30 to 70 lbf/100 ft$^2$, from 30 to 60 lbf/100 ft$^2$, from 30 to 55 lbf/100 ft$^2$, from 30 to 40 lbf/100 ft$^2$, from 40 to 70 lbf/100 ft$^2$, from 40 to 60 lbf/100 ft$^2$, from 40 to 55 lbf/100 ft$^2$, from 55 to 70 lbf/100 ft$^2$, from 55 to 60 lbf/100 ft$^2$, or from 60 to 70 lbf/100 ft$^2$.

The gel strength of a cement slurry refers to the shear stress of the cement slurry composition measured at a low shear rate (such as 3 rpm or 6 rpm) following a defined period of time during which the cement slurry composition is maintained in a static state. The shear stress of the cement slurry composition at low shear rate may be measured using a standard oilfield viscometer, such as a FANN® Model 35 viscometer operated at low rpms, such as at 3 rpm or 6 rpm, according to the test methods described in API Recommended Practice For Field Testing Water-Based Cement slurries (RP 13B-1/ISO 10414-1:2002) published August 2014 and incorporated by reference into this disclosure in its entirety. To measure the gel strength, the cement slurry composition is first stirred by contacting the cement slurry composition with the spindle of the viscometer and operating the viscometer at 600 rotations per minute (rpm). The viscometer is then turned off for period of time (time period). For a 10-second gel strength, the time period is 10 seconds, and for a 10 minute gel strength, the time period is 10 minutes. It should be understood that other time periods for measuring gel strength may be used as reference times for measurements of gel strength. During the time period, the cement slurry composition comes to rest in a static state. Upon expiration of the time period, the viscometer is turned back on at a low speed, such as 3 rpm for example, to generate a low shear rate. The viscometer reading is then taken. The gel strength of the cement slurry composition is reported in units of lbf/100 ft$^2$.

The cement slurry described in this disclosure may have a 10-second gel strength of from 5 to 50 lbf/100 ft$^2$, from 5 to 40 lbf/100 ft$^2$, from 5 to 35 lbf/100 ft$^2$, from 5 to 30 lbf/100 ft$^2$, from 5 to 25 lbf/100 ft$^2$, from 5 to 20 lbf/100 ft$^2$, from 5 to 15 lbf/100 ft$^2$, from 5 to 10 lbf/100 ft$^2$, from 10 to 50 lbf/100 ft$^2$, from 10 to 40 lbf/100 ft$^2$, from 10 to 35 lbf/100 ft$^2$, from 10 to 30 lbf/100 ft$^2$, from 10 to 25 lbf/100 ft$^2$, from 10 to 20 lbf/100 ft$^2$, from 10 to 15 lbf/100 ft$^2$, from 15 to 50 lbf/100 ft$^2$, from 15 to 40 lbf/100 ft$^2$, from 15 to 35 lbf/100 ft$^2$, from 15 to 30 lbf/100 ft$^2$, from 15 to 25 lbf/100 ft$^2$, from 15 to 20 lbf/100 ft$^2$, from 20 to 50 lbf/100 ft$^2$, from 20 to 40 lbf/100 ft$^2$, from 20 to 35 lbf/100 ft$^2$, from 20 to 30 lbf/100 ft$^2$, from 20 to 25 lbf/100 ft$^2$, from 25 to 50 lbf/100 ft$^2$, from 25 to 40 lbf/100 ft$^2$, from 25 to 35 lbf/100 ft$^2$, from 25 to 30 lbf/100 ft$^2$, from 30 to 50 lbf/100 ft$^2$, from 30 to 40 lbf/100 ft$^2$, from 30 to 35 lbf/100 ft$^2$, from 35 to 50 lbf/100 ft$^2$, from 35 to 40 lbf/100 ft$^2$, or from 40 to 50 lbf/100 ft$^2$. The 10-second gel strength of the cement slurry composition having Saudi Arabian volcanic ash may be compared to a 10-second gel strength of a comparative cement slurry without Saudi Arabian volcanic ash. The 10-second gel strength of the cement slurry composition having Saudi Arabian volcanic ash may be less than or equal to 90% of the 10-second gel strength of the comparative cement slurry, or less than or equal to 80% of the 10-second gel strength of the comparative cement slurry, or less than or equal to 70% of the 10-second gel strength of the comparative cement slurry.

The cement slurry may have a 10 minute gel strength of from 10 to 60 lbf/100 ft$^2$, from 10 to 50 lbf/100 ft$^2$, from 10 to 45 lbf/100 ft$^2$, from 10 to 40 lbf/100 ft$^2$, from 10 to 30 lbf/100 ft$^2$, from 10 to 25 lbf/100 ft$^2$, from 10 to 20 lbf/100 ft$^2$, from 10 to 15 lbf/100 ft$^2$, from 15 to 60 lbf/100 ft$^2$, from 15 to 50 lbf/100 ft$^2$, from 15 to 45 lbf/100 ft$^2$, from 15 to 40 lbf/100 ft$^2$, from 15 to 30 lbf/100 ft$^2$, from 15 to 25 lbf/100 ft$^2$, from 15 to 20 lbf/100 ft$^2$, from 20 to 60 lbf/100 ft$^2$, from 20 to 50 lbf/100 ft$^2$, from 20 to 45 lbf/100 ft$^2$, from 20 to 40 lbf/100 ft$^2$, from 20 to 30 lbf/100 ft$^2$, from 20 to 25 lbf/100 ft$^2$, from 25 to 60 lbf/100 ft$^2$, from 25 to 50 lbf/100 ft$^2$, from 25 to 45 lbf/100 ft$^2$, from 25 to 40 lbf/100 ft$^2$, from 25 to 30 lbf/100 ft$^2$, from 30 to 60 lbf/100 ft$^2$, from 30 to 50 lbf/100 ft$^2$, from 30 to 45 lbf/100 ft$^2$, from 30 to 40 lbf/100 ft$^2$, from 35 to 60 lbf/100 ft$^2$, from 35 to 50 lbf/100 ft$^2$, from 35 to 45 lbf/100 ft$^2$, from 40 to 60 lbf/100 ft$^2$, from 40 to 50 lbf/100 ft$^2$, from 40 to 45 lbf/100 ft$^2$, from 45 to 60 lbf/100 ft$^2$, from 45 to 50 lbf/100 ft$^2$, or from 50 to 60 lbf/100 ft$^2$. The 10-minute gel strength of the cement slurry composition having Saudi Arabian volcanic ash may be compared to a 10-minute gel strength of a comparative cement slurry without Saudi Arabian volcanic ash. The 10-minute gel strength of the cement slurry composition having Saudi Arabian volcanic ash may be less than or equal to 90% of the 10-minute gel strength of the comparative cement slurry, or less than or equal to 80% of the 10-minute gel strength of the comparative cement slurry, or less than or equal to 70% of the 10-minute gel strength of the comparative cement slurry.

Further embodiments of the present disclosure relate to methods of using the cement slurries previously described. In some embodiments, the method may include pumping the cement slurry into a location to be cemented and curing the cement slurry by allowing the aqueous solution and the cement precursor material to react. The location to be cemented may, for instance, be a well, a wellbore, an annulus, or other such locations.

Cementing is performed when the cement slurry is deployed into the well via pumps, displacing the drilling fluids still located within the well, and replacing them with cement. The cement slurry flows to the bottom of the wellbore through the casing, which will eventually be the pipe through which the hydrocarbons flow to the surface. From there, the cement slurry fills in the space between the casing and the actual wellbore, and hardens. This creates a seal so that outside materials cannot enter the well flow, as well as permanently positions the casing in place. In preparing a well for cementing, it is important to establish the amount of cement required for the job. This may be done by measuring the diameter of the borehole along its depth, using a caliper log. Utilizing both mechanical and sonic means, multi-finger caliper logs measure the diameter of the well at numerous locations simultaneously in order to accommodate for irregularities in the wellbore diameter and determine the volume of the openhole. Additionally, the required physical properties of the cement are essential before commencing cementing operations. The proper set cement is also determined, including the density and viscosity of the material, before actually pumping the cement into the hole.

In some embodiments, curing the cement slurry may refer to passively allowing time to pass under suitable conditions upon which the cement slurry may harden or cure through allowing one or more reactions between the aqueous solution and the cement precursor material. Suitable conditions may be any time, temperature, pressure, humidity, and other appropriate conditions known in the cement industry to cure a cement composition. In some embodiments, suitable curing conditions may be ambient conditions. Curing may also involve actively hardening or curing the cement slurry by, for instance, introducing a curing agent to the cement slurry, providing heat or air to the cement slurry, manipulating the environmental conditions of the cement slurry to facilitate reactions between the aqueous solution and the cement precursor, a combination of these, or other such means. Usually, the cement will be cured and convert from liquid to solid due to subsurface formation conditions, temperature, and pressure. In the laboratory, a curing chamber capable of applying temperature and pressure is used for curing the cement specimens at required conditions. Cubical molds (2"×2"×2") and cylindrical cells (1.4" diameter and 12" length) were lowered into the curing chamber. Pressures and temperatures were maintained until shortly before the end of the curing where they were reduced to ambient conditions.

In some embodiments, curing may occur at a relative humidity of greater than or equal to 80% in the cement slurry and a temperature of greater than or equal to 50° F. for a time period of from 1 to 14 days. Curing may occur at a relative humidity of from 80% to 100%, such as from 85% to 100%, or 90% to 100%, or from 95% to 100% relative humidity in the cement slurry. The cement slurry may be cured at temperatures of greater than or equal to 50° F., such as greater than or equal to 75° F., greater than or equal to 80° F., greater than or equal to 100° F., or greater than or equal to 120° F. The cement slurry may be cured at temperatures of from 50° F. to 250° F., or from 50° F. to 200° F., or from 50° F. to 150° F., or from 50° F. to 120° F. In some instances, the temperature may be as great as 500° F. The cement slurry may be cured for from 1 day to 14 days, such as from 3 to 14 days, or from 5 to 14 days, or from 7 to 14 days, or from 1 to 3 days, or from 3 to 7 days.

Further embodiments of the present disclosure relate to particular methods of cementing a casing in a wellbore. The method may include mixing cement precursor material, Saudi Arabian volcanic ash, and an aqueous solution to form a cement slurry, introducing the cement slurry into an annulus between the casing and the wellbore, and curing the cement slurry to cement the casing in the wellbore.

Introducing the cement slurry into an annulus may include pumping a cement slurry into the annulus between a casing and a wellbore and curing the cement slurry. The cement slurry may be in accordance with any of the embodiments previously described. Likewise, curing the cement slurry may be in accordance with any of the embodiments previously described. As stated previously, Cementing is performed when the cement slurry is deployed into the well via pumps, displacing the drilling fluids still located within the well, and replacing them with cement. The cement slurry flows to the bottom of the wellbore through the casing, which will eventually be the pipe through which the hydrocarbons flow to the surface. From there it fills in the space between the casing and the actual wellbore, and hardens. This creates a seal so that outside materials cannot enter the well flow, as well as permanently positions the casing in place.

The method may further comprise adding one or more additives selected from the group consisting of dispersants, fluid loss control agents, retarders, expansion additives, antifoaming agents, stabilizers, accelerators, extenders, weighting agents, lost circulation control agents, surfactants, gypsum, hematite, manganese tetroxide, silica flour, and silica sand.

Embodiments of the disclosure also relate to methods of producing cured cements. The method may include combining aqueous solution with a cement precursor material, and Saudi Arabian volcanic ash. The cement slurry may be in accordance with any of the embodiments previously described. The method may include curing the cement slurry by allowing for a reaction between the aqueous solution and the cement precursor material to produce cured cement. The curing step may be in accordance with any of the embodiments previously described.

In some embodiments, cement is composed of four main components: tricalcium silicate ($Ca_3O_5Si$) which contributes to the early strength development; dicalcium silicate ($Ca_2SiO_4$), which contributes to the final strength, tricalcium aluminate ($Ca_3Al_2O_6$), which contributes to the early strength; and tetracalcium alumina ferrite. These phases are sometimes called alite and belite respectively. In addition, gypsum may be added to control the setting time of cement.

In one embodiment, the silicates phase in cement may be about 75-80 wt. % of the total material. $Ca_3O_5Si$ is the major constituent, with concentration as great as 60-65 wt. %. The quantity of $Ca_2SiO_4$ conventionally does not exceed 20 wt. %, 30 wt. % or 40 wt. %. The hydration products for $Ca_3O_5Si$ and $Ca_2SiO_4$ are calcium silicate hydrate ($Ca_2H_2O_5Si$) and calcium hydroxide ($Ca(OH)_2$), also known as Portlandite. The calcium silicate hydrate commonly called CSH gel has a variable C:S and H:S ratio depending on the temperature, calcium concentration in the aqueous phase, and the curing time. The CSH gel comprises +/−70% of fully hydrated Portland cement at ambient conditions and is considered the principal binder of hardened cement. By contrast, the calcium hydroxide is crystalline with concentration of about 15-20 wt. % and is the reason the cement has a pH of greater than 7. Upon contact with the aqueous solution, the gypsum may partially dissolve, releasing calcium and sulphate ions to react with the aluminate and hydroxyl ions produced by the C3A to form a calcium trisulphoaluminate hydrate, known as the mineral ettringite ($Ca_6Al_2(SO_4)_3(OH)_{12}.26H_2O$) that will precipitate onto the $Ca_3O_5Si$ surfaces preventing further rapid hydration (flashset). The gypsum is gradually consumed and ettringite continues to precipitate until the gypsum is consumed. The sulphates ion concentration will be drop down and the ettringite will become unstable converting to calcium monosulphoaluminate hydrate ($Ca_4Al_2O_6(SO_4).14H_2O$). The remaining unhydrated $Ca_3O_5Si$ will form calcium aluminate hydrate. Cement slurry design is based on the altering or inhibition of the hydration reactions with specific additives.

The cured cement may include one or more of calcium hydroxide, silicates, oxides, belite ($Ca_2SiO_5$), alite ($Ca_3SiO_4$), tricalcium aluminate ($Ca_3Al_2O_6$), tetracalcium aluminoferrite ($Ca_4Al_2Fe_2O_{10}$), brownmilleriate ($4CaO.Al_2O_3.Fe_2O_3$), gypsum ($CaSO_4.2H_2O$) sodium oxide, potassium oxide, limestone, lime (calcium oxide), hexavalent chromium, trivalent chromium, calcium aluminate, other similar compounds, and combinations of these. The cement precursor material may include Portland cement, siliceous fly ash, calcareous fly ash, slag cement, silica fume, any known cement precursor material or combinations of any of these.

Without being bound by any particular theory, controlling the fluid loss and rheology properties of the cement slurry when producing the cured cement may result in a stronger, more stable cured cement, as previously discussed. In some embodiments, the cured cement of the present disclosure may have a compressive strength of from 400 to 5000 pounds per square inch (psi) in the compressive Strength Test. In the test, the set cement cubes were removed from the molds, and placed in a hydraulic press where increasing force was exerted on each cubes until failure. The hydraulic press system used in this study applied known compressive loads to the samples. This system was designed to test the compressive strength of sample cement cubes in compliance with API specifications for oil wells cement testing.

In some embodiments, the cement slurry may contain an aqueous solution and may be water-based. As such, the cement slurry may by hydrophilic, forming stronger bonds with water-wet surfaces. Well sections drilled with non-aqueous drilling fluids may have oil-wet surfaces, resulting in poor bonding between the well and the cement slurry, as oil and water naturally repel. Poor bonding may lead to poor isolation and a buildup of unwanted casing-casing or tubing-casing annular pressure. Without being bound by theory, it is desirable to make the subsurface formation water wet, the casing water wet, or both, to enhance and improve the bonding between cement and casing and cement and subsurface formation. If the wettability of the subsurface formation or casing is oil wet not water wet then the bonding will be poor and could result in small gap(s) or channel(s) between the cement and casing or the cement and subsurface formation thereby resulting in improper wellbore isolation. This improper wellbore isolation could lead to fluid or gas escaping from the well through this gas or channel due to de-bonding.

EXAMPLES

Example 1

Wavelength Dispersive X-ray Fluorescence (WDXRF) may be used to conduct elemental analysis. In WDXRF spectrometers, all of the elements in the sample are excited simultaneously. The different energies of the characteristic radiation emitted from the sample are diffracted into different directions by an analyzing crystal or monochrometer (similar to the action of a prism dispersing different colors of visible light into different directions). By placing the detector at a certain angle, the intensity of X-rays with a certain wavelength can be measured. Sequential spectrometers use a moving detector on a goniometer to move it through an angular range to measure the intensities of many different wavelengths. Simultaneous spectrometers are equipped with a set of fixed detection systems, where each system measures the radiation of a specific element.

For the WDXRF analysis, a sample of Saudi Arabian volcanic ash was homogenized and manually grounded by an agate mortar and a pestle for several minutes to achieve fine particle size. Then, 4 grams of the Saudi Arabian volcanic ash powder was mixed well and homogenized with 0.9 grams of a binder (Licowax C micropowder PM (Hoechstwax)). Then, the powder was pressed with 20 tons of pressure to a pellet with 31 millimeter (mm) diameter. WDXRF analysis was then performed on the sample using the standardless Omnian 27 method. The composition is shown in Table 1 to be presented.

TABLE 1

Composition of Saudi Arabian Volcanic Ash

| Element | Wt. % |
|---|---|
| O | 44.2 |
| Si | 21.8 |
| Al | 8.5 |
| Fe | 8.5 |
| Ca | 6.4 |
| Mg | 4.2 |
| Na | 3.1 |
| Ti | 1.5 |
| K | 1.0 |
| P | 0.3 |
| Mn | 0.1 |

The WDXRF results show that the sample consisted of mainly O and Si with appreciable amounts of Al, Fe, Ca, Mg, and Na.

Example 2

X-ray powder diffraction (XRD) is a rapid analytical technique primarily used for phase identification of a crystalline material and can provide information on unit cell dimensions. The analyzed material is finely ground, homogenized, and average bulk composition is determined. X-ray diffractometers consist of three basic elements: an X-ray tube, a sample holder, and an X-ray detector. X-rays are generated in a cathode ray tube by heating a filament to produce electrons, accelerating the electrons toward a target by applying a voltage, and bombarding the target material with electrons. When electrons have sufficient energy to dislodge inner shell electrons of the target material, characteristic X-ray spectra are produced. These spectra consist of several components, the most common being $K_\alpha$ and $K_\beta$. $K_\alpha$ consists, in part, of $K_{\alpha 1}$ and $K_{\alpha 2}$. $K_{\alpha 1}$ has a slightly shorter wavelength and twice the intensity as $K_{\alpha 2}$. The specific wavelengths are characteristic of the target material (Cu, Fe, Mo, Cr). Filtering, by foils or crystal monochrometers, is required to produce the monochromatic X-rays needed for diffraction. $K_{\alpha 1}$ and $K_{\alpha 2}$ are sufficiently close in wavelength such that a weighted average of the two is used. These X-rays are collimated and directed onto the sample. As the sample and detector are rotated, the intensity of the reflected X-rays is recorded. A detector records and processes this X-ray signal and converts the signal to a count rate which is then output to a device such as a printer or computer monitor.

For the XRD analysis, a sample of Saudi Arabian volcanic ash was homogenized and manually grounded by an agate mortar and a pestle for several minutes to achieve fine particle size. Then, 4 grams of the fine Saudi Arabian volcanic ash powder was mounted into the XRD sample holder by back pressing. XRD was then performed on the sample using the SALAM 014 method. The composition is shown in Table 2 to be presented.

TABLE 2

XRD Composition of Saudi Arabian Volcanic Ash

| Compound | Wt. % |
|---|---|
| Amorphous Material | 70 |
| Labradorite: $Ca_{0.65}Na_{0.32}(Al_{1.62}Si_{2.38}O_8)$ | 19 |
| Augite: $Ca(Fe, Mg)Si_2O_6$ | 6 |
| Forsterite: $Mg_2SiO_4$ | 5 |

The XRD results show that the sample consisted mainly of amorphous material with appreciable amounts of labradorite, augite, and forsterite. The WDXRF results confirmed the XRD findings.

Example 3

Cement slurries were made in accordance with the previous description. The compositions of these samples are described in the tables to be presented. The silica flour used in these examples may be found under the commercial name SSA-1 and is available from Halliburton. The expansion additive used in these examples may be found under the name MICROBOND HT and is available from Halliburton. The fluid loss additive used in these examples may be found under the name HALAD 344 and is available from Halliburton. The dispersant used in these examples may be found under the name CFR3 and is available from Halliburton. Retarder 1 used in these examples may be found under the name HR12 and is available from Halliburton. Retarder 2 used in these examples may be found under the name HR25 and is available from Halliburton. The defoamer used in these examples may be found under the name D-AIR 3000L and is available from Halliburton. The pozzolana cement used in these examples includes 79% Portland cement, 5% gypsum, and 16% Saudi Arabian volcanic ash.

TABLE 3

Composition of Inventive Sample 1
ADDITIVES

| SG | Concentration | Unit | COMPONENT |
|---|---|---|---|
| 3.117 | 100 | % BWOC | Pozzolana cement |
| 2.65 | 20 | % BWOC | Silica flour |

TABLE 3-continued

Composition of Inventive Sample 1
ADDITIVES

| SG | Concentration | Unit | COMPONENT |
|---|---|---|---|
| 3.57 | 3 | % BWOC | Expansion additive |
| 4.95 | 25 | % BWOC | Hematite |
| 4.84 | 25 | % BWOC | $Mn_3O_4$ |
| 1.22 | 0.2 | % BWOC | Fluid loss additive |
| 1.28 | 0.1 | % BWOC | Dispersant |
| 1.22 | 0.9 | % BWOC | Retarder 1 |
| 1.76 | 0.1 | % BWOC | Retarder 2 |
| 0.93 | 0.03 | GPS | Defoamer |
|  | 46.28 | % BWOC | Water |

TABLE 4

Composition of Inventive Sample 2
ADDITIVES

| SG | CONCENTRATION | UNIT | COMPONENT |
|---|---|---|---|
| 3.14 | 100 | % BWOC | Class G cement |
| 2.6 | 30 | % BWOC | Volcanic ash |
| 2.65 | 10 | % BWOC | Silica flour |
| 3.57 | 3 | % BWOC | Expansion additive |
| 4.95 | 25 | % BWOC | Hematite |
| 4.84 | 25 | % BWOC | $Mn_3O_4$ |
| 1.22 | 0.2 | % BWOC | Fluid loss additive |
| 1.28 | 0.1 | % BWOC | Dispersant |
| 1.22 | 0.9 | % BWOC | Retarder 1 |
| 1.76 | 0.1 | % BWOC | Retarder 2 |
| 0.93 | 0.03 | GPS | Defoamer |

TABLE 5

Composition of Inventive Sample 3
ADDITIVES

| SG | CONCENTRATION | UNIT | COMPONENT |
|---|---|---|---|
| 3.14 | 100 | % BWOC | Cement class G |
| 2.6 | 0.2 | % BWOC | Volcanic ash |
| 2.65 | 30 | % BWOC | Silica sand |
| 3.57 | 3 | % BWOC | Expansion additive |
| 4.95 | 20 | % BWOC | Hematite |
| 4.84 | 20 | % BWOC | $Mn_3O_4$ |
| 1.22 | 0.2 | % BWOC | Fluid loss additive |
| 1.28 | 0.3 | % BWOC | Dispersant |
| 1.22 | 0.9 | % BWOC | Retarder 1 |
| 1.76 | 0.1 | % BWOC | Retarder 2 |
| 0.93 | 0.03 | GPS | Defoamer |
| 1 | 0.15 | GPS | Latex |
| 1 | 45.7 | % BWOC | Water |
| Mix water/mix fluid |  | GPS/GPS | 5.16/5.48 |

TABLE 6

Composition of Inventive Sample 4
ADDITIVES

| SG | CONCENTRATION | UNIT | COMPONENT |
|---|---|---|---|
| 3.14 | 100 | % BWOC | Cement class G |
| 2.6 | 0.2 | % BWOC | Volcanic ash |
| 2.65 | 30 | % BWOC | Silica sand |
| 3.57 | 3 | % BWOC | Expansion additive |
| 4.95 | 0 | % BWOC | Hematite |
| 4.84 | 23 | % BWOC | $Mn_3O_4$ |
| 1.22 | 0.2 | % BWOC | Fluid loss additive |
| 1.28 | 0.3 | % BWOC | Dispersant |

TABLE 6-continued

Composition of Inventive Sample 4
ADDITIVES

| SG | CONCENTRATION | UNIT | COMPONENT |
|---|---|---|---|
| 1.22 | 1.5 | % BWOC | Retarder 1 |
| 1.76 | 0.15 | % BWOC | Retarder 2 |
| 0.93 | 0.1 | GPS | Defoamer |
| 1 | 0.15 | GPS | Latex |
| 1.06 | 0.3 | GPS | Stabilizer |
| 1 | 35 | % BWOC | Water |
| Mix water/mix fluid |  | GPS/GPS | 3.96/4.62 |

TABLE 7

Composition of Inventive Sample 5
ADDITIVES

| SG | CONCENTRATION | UNIT | COMPONENT |
|---|---|---|---|
| 3.117 | 100 | % BWOC | Pozzolana cement |
| 2.65 | 20 | % BWOC | Silica flour |
| 3.57 | 3 | % BWOC | Expansion additive |
| 4.95 | 20 | % BWOC | Hematite |
| 4.84 | 20 | % BWOC | $Mn_3O_4$ |
| 1.22 | 0.2 | % BWOC | Fluid loss additive |
| 1.28 | 0.1 | % BWOC | Dispersant |
| 1.22 | 0.9 | % BWOC | Retarder 1 |
| 1.76 | 0.1 | % BWOC | Retarder 2 |
| 0.93 | 0.03 | GPS | Defoamer |

TABLE 8

Composition of Inventive Sample 6
ADDITIVES

| SG | CONCENTRATION | UNIT | COMPONENT |
|---|---|---|---|
| 3.117 | 100 | % BWOC | Pozzolana cement |
| 2.65 | 35 | % BWOC | Silica flour (SSA-1) |
| 3.57 | 3 | % BWOC | Expansion additive |
| 0.93 | 0.03 | GPS | Defoamer |
| 1.06 | 0.3 | GPS | Stabilizer |
| 1 | 1.5 | GPS | Latex |
| 1.22 | 0.15 | % BWOC | Fluid loss additive |
| 1.22 | 0.9 | % BWOC | Retarder 1 |
| 1.76 | 0.1 | % BWOC | Retarder 2 |
| 1 | 28.4 | % BWOC | Water |

TABLE 9

Composition of Inventive Sample 7
ADDITIVES

| SG | CONCENTRATION | UNIT | COMPONENT |
|---|---|---|---|
| 3.117 | 100 | % BWOC | Pozzolana cement |
| 2.65 | 20 | % BWOC | Silica flour (SSA-1) |
| 3.57 | 3 | % BWOC | Expansion additive |
| 4.95 | 20 | % BWOC | Hematite |
| 4.84 | 20 | % BWOC | $Mn_3O_4$ |
| 1.22 | 0.15 | % BWOC | Fluid loss additive |
| 1.28 | 0.2 | % BWOC | Dispersant |
| 1.22 | 0.9 | % BWOC | Retarder 1 |
| 1.76 | 0.1 | % BWOC | Retarder 2 |
| 0.93 | 0.03 | GPS | Defoamer |
| 1 | 55.6 | % BWOC | Water |

TABLE 10

Composition of Inventive Sample 8

ADDITIVES

| SG | CONCENTRATION | UNIT | COMPONENT |
|---|---|---|---|
| 3.14 | 100 | % BWOC | Class G cement |
| 2.6 | 0.2 | % BWOC | Volcanic ash |
| 2.65 | 30 | % BWOC | Silica flour |
| 3.57 | 3 | % BWOC | Expansion additive |
| 4.95 | 25 | % BWOC | Hematite |
| 4.84 | 25 | % BWOC | $Mn_3O_4$ |
| 1.22 | 0.2 | % BWOC | Fluid loss additive |
| 1.28 | 0.1 | % BWOC | Dispersant |
| 1.22 | 0.9 | % BWOC | Retarder 1 |
| 1.76 | 0.1 | % BWOC | Retarder 2 |
| 0.93 | 0.03 | GPS | Defoamer |
| 1 | 51.5 | % BWOC | Water |

The plastic viscosity and the yield point of each sample were then measured using a Fann 35 rotational viscometer. Density and water level separation values are also provided in the tables to be presented. Water level separation is an indicator of the settling of weighting agents in a cement slurry. Specifically, a cement slurry with a lesser water separation value will have a lesser amount of settling of weighting agents as compared to a cement with a greater water separation value. Furthermore, a cement slurry with less water separation with have a more uniform density throughout the cement slurry as compared to a cement slurry with more water separation. The water separation measurement was taken after letting 250 ml of cement slurry settle for 2 hours, and measuring the water separation.

TABLE 11

Rheology Data for Inventive Sample 1

| | $\theta_{ramp\ up}$ | $\theta_{ramp\ down}$ | $\theta_{avg}$ | $\mu_{avg}$ |
|---|---|---|---|---|
| 300 rpm | 240 | 240 | 240 | 240 cP |
| 200 rpm | 178 | 179 | 178.5 | 268 cP |
| 100 rpm | 110 | 112 | 111 | 333 cP |
| 6 rpm | 42 | 42 | 42 | 2100 cP |
| 3 rpm | 33 | 34 | 33.5 | 3350 cP |
| PV | 186 cP | 183 cP | 184.5 cP | — |
| YP | 54 lbf/100 ft$^2$ | 57 lbf/100 ft$^2$ | 56 lbf/100 ft$^2$ | — |
| 10 sec gel strength | | 33 lbf/100 ft$^2$ | | |
| 10 min gel strength | | 41 lb/100 ft$^2$ | | |
| Density | | 140 lb/ft | | |

TABLE 12

Rheology Data for Inventive Sample 2

| | $\theta_{ramp\ up}$ | $\theta_{ramp\ down}$ | $\theta_{avg}$ | $\mu_{avg}$ |
|---|---|---|---|---|
| 300 rpm | 207 | 207 | 207 | 207 cP |
| 200 rpm | 144 | 150 | 147 | 220 cP |
| 100 rpm | 89 | 93 | 91 | 273 cP |
| 6 rpm | 37 | 35 | 36 | 1800 cP |
| 3 rpm | 27 | 27 | 27 | 2700 cP |
| PV | 189 cP | 171 cP | 180 cP | — |
| YP | 18 lbf/100 ft$^2$ | 36 lbf/100 ft$^2$ | 27 lbf/100 ft$^2$ | — |
| 10 sec gel strength | | 28 lbf/100 ft$^2$ | | |
| 10 min gel strength | | 28 lb/100 ft$^2$ | | |
| Water separation | | 0 cc | | |
| Density | | 140 lb/ft$^3$ | | |

TABLE 13

Rheology Data for Inventive Sample 3

| | $\theta_{avg}$ | $\mu_{avg}$ |
|---|---|---|
| 300 rpm | Over range | — |
| 200 rpm | 215 | 322 cP |
| 100 rpm | 116 | 348 cP |
| 6 rpm | 17 | 850 cP |
| 3 rpm | 14 | 1400 cP |
| PV | 297 cP | — |
| YP | 17 lbf/100 ft$^2$ | — |
| 10 sec gel strength | 17 lbf/100 ft$^2$ | |
| 10 min gel strength | 26 lb/100 ft$^2$ | |
| Water separation | 1 cc | |
| Density | 141 lb/ft$^3$ | |

TABLE 14

Rheology Data for Inventive Sample 4

| | $\theta_{avg}$ | $\mu_{avg}$ |
|---|---|---|
| 300 rpm | Over range | — |
| 200 rpm | 244 | 366 cP |
| 100 rpm | 141 | 423 cP |
| 6 rpm | 33 | 1650 cP |
| 3 rpm | 23 | 2300 cP |
| PV | 309 | — |
| YP | 38 lbf/100 ft$^2$ | — |
| 10 sec gel strength | 27 lbf/100 ft$^2$ | |
| 10 min gel strength | 44 lb/100 ft$^2$ | |
| Water separation | 1 cc | |
| Density | 141 lb/ft$^3$ | |

TABLE 15

Rheology Data for Inventive Sample 5

| | $\theta_{ramp\ up}$ | $\theta_{ramp\ down}$ | $\theta_{avg}$ | $\mu_{avg}$ |
|---|---|---|---|---|
| 300 rpm | 80 | 80 | 80 | 80 cP |
| 200 rpm | 60 | 61 | 60.5 | 91 cP |
| 100 rpm | 36 | 37 | 36.5 | 110 cP |
| 6 rpm | 13 | 12 | 12.5 | 625 cP |
| 3 rpm | 12 | 11 | 11.5 | 1150 cP |
| PV | 60 cP | 57 cP | 58.5 cP | — |
| YP | 20 lbf/100 ft$^2$ | 23 lbf/100 ft$^2$ | 22 lbf/100 ft$^2$ | — |
| 10 sec gel strength | | 16 lbf/100 ft$^2$ | | |
| 10 min gel strength | | 24 lb/100 ft$^2$ | | |
| Water separation | | 0 cc | | |
| Density | | 129 lb/ft$^3$ | | |

TABLE 16

Rheology Data for Inventive Sample 6

| | $\theta_{avg}$ | $\mu_{avg}$ |
|---|---|---|
| 600 rpm | 240 | 120 cp |
| 300 rpm | 130 | 130 cp |
| 200 rpm | 87 | 130.5 cP |
| 100 rpm | 48 | 144 cP |
| 6 rpm | 12 | 600 cP |
| 3 rpm | 10 | 1000 cP |
| PV | 110 cP | — |
| YP | 20 lbf/100 ft$^2$ | — |
| 10 sec gel strength | 12 lbf/100 ft$^2$ | |
| 10 min gel strength | 19 lb/100 ft$^2$ | |
| Water separation | 0.25 cc | |
| Density | 125 lb/ft$^3$ | |

Table 17

Rheology Data for Inventive Sample 7

| | $\theta_{avg}$ | $\mu_{avg}$ |
|---|---|---|
| 600 rpm | 127 | 63.5 cp |
| 300 rpm | 68 | 68 cp |
| 200 rpm | 49 | 73.5 cP |
| 100 rpm | 39 | 117 cP |
| 6 rpm | 7 | 350 cP |
| 3 rpm | 6 | 600 cP |
| PV | 59 cP | — |
| YP | 9 lbf/100 ft² | — |
| 10 sec gel strength | 9 lbf/100 ft² | |
| 10 min gel strength | 18 lb/100 ft² | |
| Water separation | 1 cc | |
| Density | 129 lb/ft³ | |

TABLE 18

Rheology Data for Inventive Sample 8

| | $\theta_{ramp\ up}$ | $\theta_{ramp\ down}$ | $\theta_{avg}$ | $\mu_{avg}$ |
|---|---|---|---|---|
| 300 rpm | 139 | 142 | 140.5 | 140.5 cP |
| 200 rpm | 106 | 105 | 105.5 | 158 cP |
| 100 rpm | 67 | 68 | 67.5 | 202 cP |
| 6 rpm | 30 | 29 | 29.5 | 1475 cP |
| 3 rpm | 27 | 27 | 27 | 2700 cP |
| PV | 99 cP | 111 cP | 105 cP | — |
| YP | 40 lbf/100 ft² | 31 lbf/100 ft² | 35.5 lbf/100 ft² | — |
| 10 sec gel strength | | 25 lbf/100 ft² | | |
| 10 min gel strength | | 49 lb/100 ft² | | |
| Density | | 140 lb/ft³ | | |

The thickening time for Inventive Sample 2 was determined to be approximately 1 hour and 55 minutes at 100° F. and approximately 3000 psi, using a Chandler Engineering Consistometer Model 8340 according to API Spec 10 Code Schedule(1), API Recommended Practice 10B-2, and the Chandler Engineering Instruction Manual.

The following description of the embodiments is illustrative in nature and is in no way intended to be limiting it its application or use. As used throughout this disclosure, the singular forms "a," "an," and "the" include plural referents unless the context clearly dictates otherwise. Thus, for example, reference to "a" component includes aspects having two or more such components, unless the context clearly indicates otherwise.

It should be apparent to those skilled in the art that various modifications and variations may be made to the embodiments described within without departing from the spirit and scope of the claimed subject matter. Thus, it is intended that the specification cover the modifications and variations of the various embodiments described within provided such modification and variations come within the scope of the appended claims and their equivalents.

It is noted that one or more of the following claims utilize the term "where" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

Having described the subject matter of the present disclosure in detail and by reference to specific embodiments of any of these, it is noted that the various details disclosed within should not be taken to imply that these details relate to elements that are essential components of the various embodiments described within, even in cases where a particular element is illustrated in each of the drawings that accompany the present description. Further, it should be apparent that modifications and variations are possible without departing from the scope of the present disclosure, including, but not limited to, embodiments defined in the appended claims. More specifically, although some aspects of the present disclosure are identified as particularly advantageous, it is contemplated that the present disclosure is not necessarily limited to these aspects.

What is claimed is:

1. A method of making a cement slurry comprising:
   mixing cement precursor material, Saudi Arabian volcanic ash acquired from Saudi Arabia, and an aqueous solution to form the cement slurry, in which
   the Saudi Arabian volcanic ash comprises $SO_3$, CaO, $SiO_2$, $Al_2O_3$, $Fe_2O_3$, MgO, and $K_2O_1$ and the Saudi Arabian volcanic ash is free of $TiO_2$;
   the cement slurry is free of any other $SiO_2$ additive; and
   the cement precursor material is selected from the group consisting of calcium hydroxide, oxides, belite, alite, tricalcium aluminate, tetracalcium aluminoferrite, brownmillerite, gypsum, sodium oxide, potassium oxide, limestone, lime, hexavalent chromium, trivalent chromium, calcium aluminate, hematite, manganese tetroxide, Portland cement, calcareous fly ash, slag cement, and quartz.

2. The method of claim 1, in which the Saudi Arabian volcanic ash has a particle size of from 20 to 30 μm.

3. The method of claim 1, in which the Saudi Arabian volcanic ash comprises from 0.05 wt. % to 0.2 wt. % $SO_3$.

4. The method of claim 1, in which the Saudi Arabian volcanic ash comprises:
   from 0.05 wt. % to 0.2 wt. % $SO_3$;
   from 5 wt. % to 10 wt. % CaO;
   from 40 wt. % to 50 wt. % $SiO_2$;
   from 10 wt. % to 20 wt. % $Al_2O_3$;
   from 10 wt. % to 15 wt. % $Fe_2O_3$;
   from 5 wt. % to 10 wt. % MgO; and from 0.5 wt. % to 5 wt. % $K_2O$.

5. The method of claim 1, in which the cement slurry comprises from 8 to 60 wt. % BWOC (by weight of cement precursor) Saudi Arabian volcanic ash.

6. The method of claim 1, in which the cement slurry has a density of from 110 to 160 lb/ft³.

7. The method of claim 1, in which the cement slurry has a yield point of from 5 to 70 lbf/100 ft².

8. The method of claim 1, in which the method further comprises adding one or more additives selected from the group consisting of dispersants, fluid loss control agents, retarders, expansion additives, antifoaming agents, stabilizers, accelerators, extenders, weighting agents, lost circulation control agents, surfactants, gypsum, hematite, and manganese tetroxide.

9. A method of making a cement slurry comprising:
   mixing cement precursor material, from 8 to 60 wt. % BWOC Saudi Arabian volcanic ash acquired from Saudi Arabia, and an aqueous solution to form the cement slurry, in which
   the Saudi Arabian volcanic ash comprises from 0.05 wt. % to 0.2 wt. % $SO_3$, from 5 wt. % to 10 wt. % CaO, from 40 wt. % to 50 wt. % $SiO_2$, from 10 wt. % to 20 wt. % $Al_2O_3$, from 10 wt. % to 15 wt. % $Fe_2O_3$, from 5 wt. % to 10 wt. % MgO, and from 0.5 wt. % to 5 wt. % $K_2O$, and the Saudi Arabian volcanic ash is free of $TiO_2$;

the cement slurry is free of any other $SiO_2$ additive, has a density of from 110 to 160 lb/ft$^3$, and has a yield point of from 5 to 70 lbf/100 ft$^2$; and the cement precursor material is selected from the group consisting of calcium hydroxide, oxides, belite, alite, tricalcium aluminate, tetracalcium aluminoferrite, brownmillerite, gypsum, sodium oxide, potassium oxide, limestone, lime, hexavalent chromium, trivalent chromium, calcium aluminate, hematite, manganese tetroxide, Portland cement, calcareous fly ash, slag cement, and quartz.

* * * * *